United States Patent [19]

Czerwiec

[11] Patent Number: 5,361,293
[45] Date of Patent: Nov. 1, 1994

[54] LINE/DROP TESTING FROM A CRAFT TERMINAL USING TEST UNIT

[75] Inventor: Richard M. Czerwiec, Raleigh, N.C.

[73] Assignee: Alcatel Network Systems, Inc., Richardson, Tex.

[21] Appl. No.: 869,618

[22] Filed: Apr. 16, 1992

[51] Int. Cl.[5] ............... H04M 1/24; H04M 3/22; H04J 1/16; H04J 3/14

[52] U.S. Cl. ............... 379/27; 379/29; 379/30; 370/13; 370/16

[58] Field of Search ........... 379/6, 10, 24, 26, 30, 379/27, 29; 370/13, 16

[56] References Cited

U.S. PATENT DOCUMENTS

| | | |
|---|---|---|
| 5,027,349 | 6/1991 | Thorne . |
| 5,054,056 | 10/1991 | Burke et al. ............... 379/27 |
| 5,060,229 | 10/1991 | Tyrrell et al. . |
| 5,063,585 | 11/1991 | Shapiro ............... 379/30 |
| 5,111,497 | 5/1992 | Bliven et al. ............... 379/27 |
| 5,195,124 | 3/1993 | Ishioka ............... 379/29 X |
| 5,208,803 | 5/1993 | Conforti et al. ............... 379/29 X |

OTHER PUBLICATIONS

AT&T Bell Laboratories Technical Journal, vol. 63, No. 10, Part 2, Dec. 1984, pp. 2315-2318; 2373-2385.

Bellcore Technical Advisory TR-NWT-000909, Issue 1, Dec. 1991, Sections 2.9.8 and 11.4 (Testing).

Primary Examiner—Stephen Chin
Assistant Examiner—Paul Loomis
Attorney, Agent, or Firm—Ware Fressola, Van Der Sluys & Adolphson

[57] ABSTRACT

A subscriber equipment (210) is isolated (238, 234) at a line card (208) in a line shelf (200) and drop testing is conducted over a test-out bus (240) by a test unit (220) connected (236) to the subscriber equipment (210); the test unit (220) may be plugged into any line card slot in any of a plurality of line shelves (200, . . . , 202); if the test unit (220) is plugged into a line shelf (202) and it is desired to test subscriber equipment (210) in another line shelf (200), appropriate contacts (242 or 244) in test access units (246, 246a) in the corresponding line shelves (200, 202) are activated to provide access from the test unit in one (202) line shelf to the subscriber equipment connected into the other (200) line shelf; the test unit (220) may also be equipped with devices (211, 213) for conducting line testing over a cross-connect path created between the line under test and the test unit (220) wherein the line is terminated at the line shelf with terminations (TERMS) in the test access unit (246) to simulate the isolated subscriber equipment.

5 Claims, 7 Drawing Sheets

LINE/DROP TESTING FROM A CRAFT TERMINAL USING TEST UNIT

CROSS-REFERENCE TO RELATED APPLICATION

This application discloses subject matter which is disclosed and claimed in a co-owned and co-pending application filed Jul. 30, 1991 under U.S. Ser. No. 07/738,102, entitled, "Subscriber Loop Testing in a Fiber-to-the-Curb Telecommunications Network", which is hereby incorporated by reference.

TECHNICAL FIELD

The present invention relates to telecommunications and, more particularly, to a system for subscriber loop testing.

BACKGROUND OF THE INVENTION

A system has been developed to permit customer loops served by a digital loop carrier (DLC) to be tested from a loop maintenance operating system (LMOS) or a repair service bureau (RSB). This system provides a means of switching that will connect incoming RSB test trunks to a DC bypass around a carrier system to a distribution pair terminating on a remote terminal (RT) or, in the absence of a DC bypass pair (Fiber Optic DLC), allows distribution pairs to be tested by a Remote Test Unit (RTU) in the RT. The method requires an item of central office equipment, called a pair gain test controller (PGTC), which will support all carrier systems deployed from a particular wire center. The PGTC is a microcomputer-controlled device that interacts with circuitry in each of a plurality of carrier systems to provide metallic access to customer drops. This allows the LMOS or RSB to perform standard tests on a drop, while at the same time, the PGTC performs a series of automatic transmission and signaling tests on the derived carrier channel. A description of the PGTC in connection with channel and drop testing is described in detail at pages 2373-2385 of the AT&T Bell Laboratories Technical Journal, Vol. 63, No. 10, Part 2, of December 1984. The channel testing features are described in further detail at pages 2315-2318.

Many systems have proprietary test schemes, usually using a test head at the central office (CO) and a test unit at the remote terminal (RT) coordinated by an operations system (OS).

The testing process consists of two distinct intervals: the test set-up interval, where the set-up and cut-through of the DC bypass path from the RSB to the customer are established or where a Test System Controller to RTU communication link is established in Fiber Optic DLC applications; and the testing interval, where the PGTC conducts a test of the derived channel while the RSB or RTU is testing the customer's drop. The test set-up interval is initiated by first dialing the customer's telephone number over one of the RSB test trunks. A handshaking sequence of events at the interface between the PGTC and the test unit and channel unit under test then proceeds during the test set-up interval which takes little more than approximately one second.

During the testing interval, and while the RSB test facility is performing its normal tests of the customer's drop, the PGTC conducts an automatic transmission and signaling test of the derived channel. This test is conducted immediately after cut-through of the DC test path and is completed within approximately two seconds for single parties. The results of these tests are forwarded as a tone or sequence of tones to the RSB test facility. The transmission tests check that transmission parameters of the carrier channel are not grossly out of limits. The signaling checks insure that the carrier system channel can detect and repeat the necessary telephone control and supervision signals. The transmission and signaling tests are described at page 2378 of the above cited technical chart in section 3.2.2.

The transmission tests require that the carrier system RT be able to apply three types of terminations to the RT channel unit under test: a reflective termination (short circuit), an absorptive termination (900 ohms) and a resistance to ground that is less than 3,000 ohms. The resistance to ground is poled through diodes to allow current to flow from either a positive or negative battery, depending on the test being conducted.

Two types of return loss measurements are performed: (1) a measure of round trip channel loss performed with the RT channel unit terminated by a reflective termination and a (2) a measure of echo-return loss with the RT channel unit terminated by an absorptive termination. A round trip idle channel noise test is also made by turning off a swept oscillator in the PGTC channel tester unit while the RT channel unit has an AC reflective termination.

The automatic sequences are performed in a manner that excerises all of the signaling states while conducting the transmission measurements. The RT channel test unit is capable of recognizing various signaling tests and responds by applying an appropriate termination across tip and ring of the RT channel unit. These terminations are detectable at the intermediate central office terminal by the PGTC and each allows a particular transmission measurement to be made. A state diagram for the sequencing of the RT terminations is shown in FIG. 7 of the above cited technical journal at page 2381. The state diagram shows an echo-return loss test conducted with an absorptive termination, a round-trip channel loss test is shown with a reflective termination tested with an oscillator at the PGTC tester unit and an idle channel noise test may be made with the oscillator off. At this point, the channel has been checked for transmission parameters and its signaling has been verified as sufficient to support a single party service.

The RSB test system can obtain the results of the automatic tests from the PGTC which presents the results as a pattern of audible tones and as DC voltages applied to the test trunk as summarized in table 2 on page 2385 of the above cited technical journal. When the RSB test system has completed all the tests of the customer's drop and has received the results of the PGTC tests, it must issue a disconnect signal to the PGTC which tells the PGTC to release the test connection. The PGTC, in turn, notifies the carrier system to restore all connections to normal.

MLT is typically run from LMOS or RSB on a routine basis overnight. Craft then gets a list of bad lines to fix. Craft can also call LMOS to do specific tests on a specific line to see if maintenance actions performed have fixed the problem. But the craft person cannot personally run any of these tests by himself. Furthermore, many independent telephone companies have neither craft test capability nor MLT and therefore must resort to manual test methods.

Unfortunately, it is particularly uneconomical for some operating companies (especially independents) to use mechanized loop testing (MLT), although they would very much like some kind of loop test capability and/or line card diagnostics.

DISCLOSURE OF INVENTION

In the above cross-referenced, co-pending application, a subset of the above-described method of MLT testing was disclosed for testing line cards resident at an optical network unit (ONU) in a fiber-to-the-curb (FTC) configuration. In that disclosure, an ONU test unit (OTU) for performing a limited number of tests was described in detail. It was shown located in the ONU for running the tests described by a recent Bellcore Technical Advisory TA-NWT-000909 that required that a limited number of selected line faults be tested for, with the results transmitted to a remote measurement unit (RMU) in a remote terminal (RT) in the form of a series of resistive signatures. This was designed primarily to alleviate the need for providing a remote measurement unit in the ONU, which could have been cost-prohibitive in the FTC context. Thus, the invention disclosed in the co-pending application provided an OTU located in the ONU for running the tests described by TA-909 under the control of a line shelf processor (LSP) located within the ONU. The LSP controlled the selected TA-909 testing in conjunction with a PGTC and an RSB initiating end-to-end channel tests. The OTU operated in conjunction with a test access unit (TAC) in implementing the tests which were routinely initiated and run by the LSP. The data for all line test states was stored on a per-line basis in an LSP memory until the LSP was requested to do a line test via normal MLT test methods. If MLT test times precluded a real-time test when a test request was received, the LSP forwarded a test result code from the LSP memory to the dual network controller (DNC) located in the RT. If MLT test time was available, tests would be performed when a test request was received, and the results would be forwarded by the LSP to the DNC via a test code. The test code instructed the DNC to place a specific resistive signature across the test access path (TAP) of the RT's RMU for recognition.

During this process, the RMU did its normal tests on the TAP and forwarded the results to the test head. When the RMU saw the specific signature, it reported this back to the test head, which then knew an ONU-originated drop test was being reported, as opposed to a local metallic subscriber pair. During this process, normal channel testing was being performed by the PGTC through the COT over an OC1/OC3 fiber to the RT and over an FTC fiber to the ONU to the line card being tested, with the MLT test terminations and voltage/signaling state recognition circuitry provided by the TAC card working in conjunction with the LSP.

Thus, according to that disclosure, a series of drop tests as defined in TA-909 were shown as being performed in a selected order of priority on lines in an ONU (via an OTU), with the testing result transmitted to the LSP (through the LSA) using a defined format via a line unit interface bus (LUIB). The LSP, in turn, took the result of the test and sent it over a serial bus interface (SBI) link (in the above-cited co-pending application, this was an optical link, but can also be metallic, as shown, for example, in U.S. Pat. No. 5,060,229 to Tyrrell et al, entitled, "Serial Transport Frame Format Method") to the DNC, where the DNC communicated to the RMUI to place a resistive "signature" across the remote measurement unit's test access path.

According to the present invention, drop testing as well as line circuit testing can be accomplished in an RT (or ONU), with the same OTU-like configuration disclosed in the above-cited co-pending application being placed in any ONU or RT line card slot. Only one OTU-like device is needed per RT. In the context of the assignee's equipment, for example, no changes are needed to existing cabling and test bus arrangements, while only a propitious definition of the I/O of the OTU board is required as shown below.

This new capability is especially attractive for operating companies, especially independents, that do not use MLT, but would like some type of loop test capability. But even for companies that use MLT, the present invention provides local, immediate line/drop diagnostic capability to the craftsperson on site.

In further accord with the present invention, an LSP similar to the LSP in the ONU may be used to hold the result of the test for display purposes via a craft interface at an ONU, COT or RT. Moreover, the line can be retested, as needed.

This is of advantage to craft personnel sent to fix a line problem, enabling the craft to immediately determine whether or not a problem has been fixed.

The foregoing and other objects, features and advantages of the present invention will become more apparent in light of the following detailed description of a best mode embodiment thereof, as illustrated in the accompanying drawings.

BEST MODE FOR CARRYING OUT THE INVENTION

Figure 1:
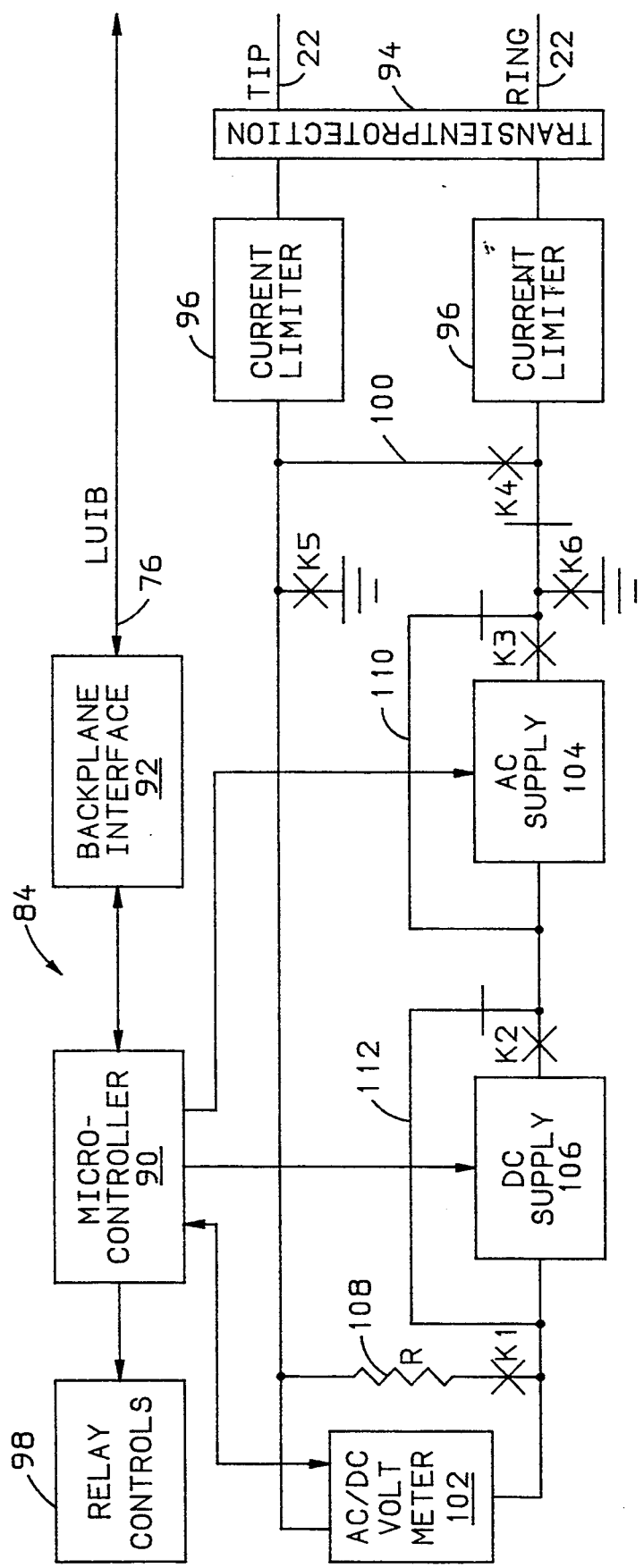
FIG. 1 is block diagram of an ONU test unit (OTU) as disclosed in the above-cited co-pending application and as disclosed hereinfurther for additional new uses, according to the present invention.
Figure 2:
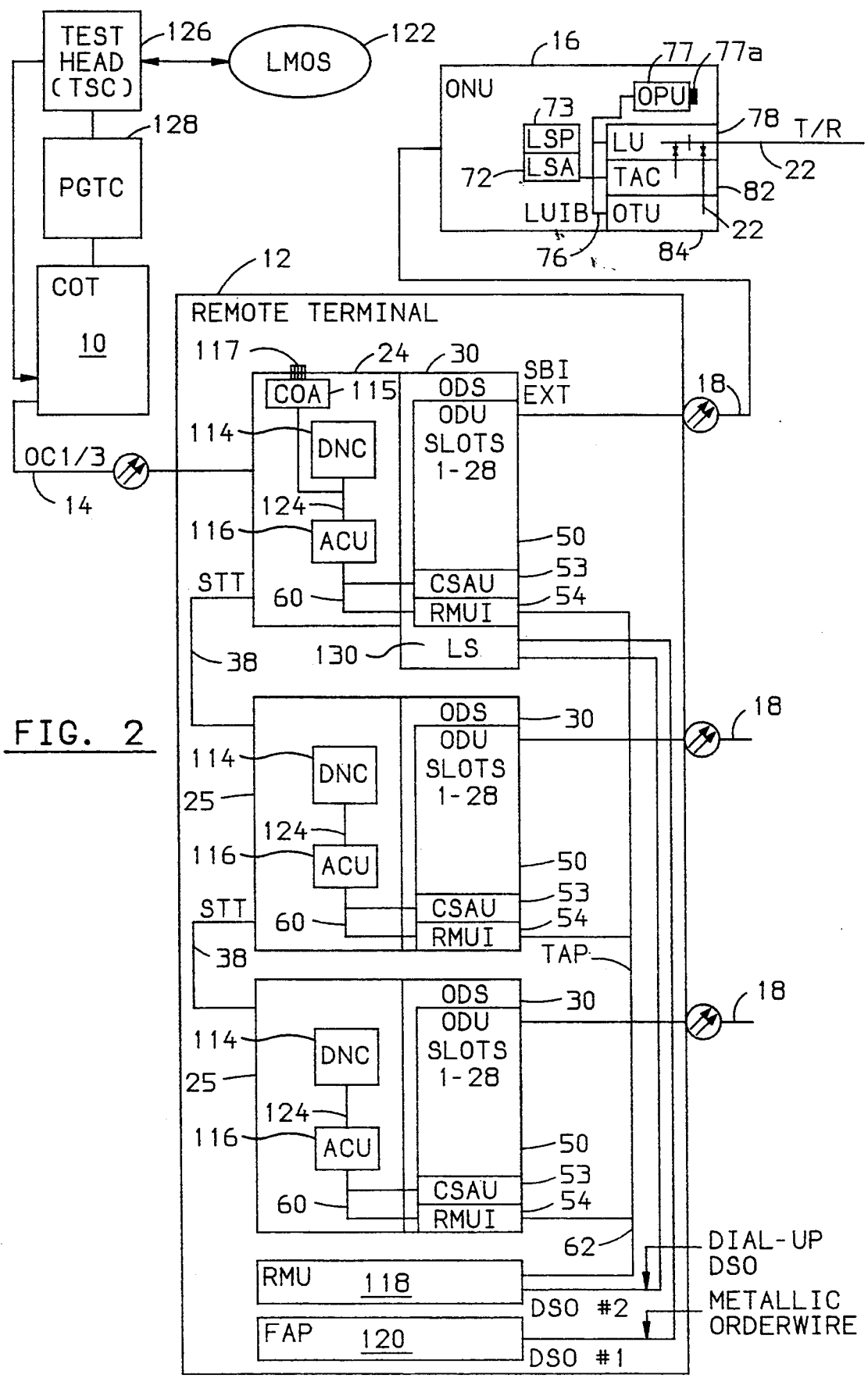
FIG. 2 is a block diagram illustrating the components used for implementing MLT subscriber loop testing, as disclosed in the above-mentioned co-pending U.S. Patent Application and as disclosed hereinfurther, according to the present invention.

Referring to FIG. 1, there is shown a block diagram of an OTU 84, which is used to implement the above described TA-909 tests, as disclosed in co-pending application Ser. No. 07/738,102 and as disclosed further herein for additional new uses according to the present invention. The OTU includes a microcontroller 90 connected to a backplane interface 92, which connects to an LUIB 76, which functions as an intermediate high-speed serial bus to provide communication between microcontroller 90, the LSP 73 and the core 30 in FIG. 2. Also shown in FIG. 2 is an ONU Port Unit (OPU) 77 connected to the LUIB. It provides an RS-232C craft interface which may simply be a jack 77a for plugging in a terminal for initiating tests, according to the present invention. The microcontroller 90, as disclosed, functions as a slave unit responding to system commands and queries, and it is not able to interrupt the system but could be designed differently to have that capability. The OTU connects to the tip and ring lines of metallic pair 22 through a transient protection component 94, which protects against lightning and power faults. Both the tip and ring lines pass through current limiters 96 which function to limit the current when performing three terminal Foreign EMF (FEMF) tests. During these tests, tip and ring are either shorted to ground or shorted together.

A plurality of relays K1–K6 are controlled by the microcontroller 90 operating through the relay control block 98. The relay control block 98 contains the relay drivers and coils necessary to control the relays for the various switching contacts K1–K6.

After passing through the current limiters 96, the tip and ring lines may be shorted by a line 100 in which contacts of relay K4 are located. The lines may also be shorted to ground by the contacts of relays K5 and K6. The tip line continues to one end of an AC/DC voltmeter 102, while the ring line may be connected to an AC supply 104 and/or a DC supply 106, after which the ring line is connected to an opposite end of the AC/DC voltmeter 102. The voltmeter 102, AC supply 104 and DC supply 106 are connected to the microcontroller 90 and are controlled thereby. The microcontroller functions to read and store the readings of the AC/DC voltmeter 102. A resistor 108 is connected across the tip and ring lines in series with contacts of relay K1.

A bypass 110 is provided around the AC supply 104 and is inserted by the action of the contacts of relay K3. In like manner, a bypass 112 is provided around the DC supply 106 and is inserted by the contacts of relay K2.

The AC supply 104 is a 24 Hz source superimposed on 45 or 70 volts DC to measure AC impedance in the "Presence of Ringer Test" per TA 909. The DC supply 106 is a floating supply capable of three different voltage levels: 10 volts for measuring resistance below the turn-on threshold of the MTU or NT1; 45 volts for measuring resistance above the turn-on threshold of the MTU or Network Termination Unit (NT1); and 70 volts for measuring the reverse bias signature of the MTU.

The AC/DC voltmeter measures and reports the voltage appearing across it. For FEMF measurements, relays K2 and K3 will bypass the DC and AC supplies, and the voltmeter will measure the voltages appearing at tip and ring, depending upon the state of relays K4, K5 and K6. For DC and AC resistance measurements, the K2 and K3 relays will enable the DC and AC supplies, and relay K1 will insert resistor R, the current measuring resistance. The voltmeter will report the voltage drop across resistor R, which will be converted to current by the microcontroller.

Table I illustrates the state of the relays and power supplies shown in FIG. 1 during the various tests set forth in the Table.

TABLE I

| TEST | K1 | K2 | K3 | K4 | K5 | K6 | DC | AC |
|---|---|---|---|---|---|---|---|---|
| FEMF | Off | Off | Off | X | X | X | Off | Off |
| Resistive Faults | On | On | Off | X | X | X | On | Off |
| ROH | On | On | On | Off | Off | Off | On | Off |
| Ringers | On | On | On | X | X | X | On | On |
| MTU | On | On | On | Off | Off | Off | On | Off |
| NT1 | On | On | On | Off | Off | Off | On | Off |

Note: "X" means that the relay follows a three-terminal test sequence.

The various tests that are performed are the Foreign Electromotive Force (FEMF), Resistive Faults, Receiver Off Hook (ROH), Presence of Ringers, Maintenance Terminal Unit (MTU) and Network Termination Unit (NT1). Other tests can be accommodated in the future as the need arises, with resistive signatures reserved for future use. The details of these tests may be found in the Bellcore Technical Advisory TA-NWT-000909, which is hereby incorporated herein by reference.

Referring to FIG. 2, there are illustrated the components required to implement the MLT testing of ONU-based subscriber loops in FTC applications as described in the above cited copending application. The RT 12 includes many of the previously-discussed components, the functions of which may be further discussed hereinbelow. The RT 12 includes a number of cross-connect cores 24 and 25 interconnected by electrical STS-1 high-speed links 38, each core including a redundant Dual Network Controller (DNC) 114, a Craft, Orderwire & Alarm (COA) 115 Unit and an Alarm Control Unit (ACU) 116 interconnected by a high speed bus. The COA 115 includes another craft interface 117 which may also be a jack for plugging in a terminal, according to the present invention. The RT 12 also includes a Remote Measurement Unit (RMU) 118 and a Fuse and Alarm Panel (FAP) 120.

A Remote Measurement Unit Interface (RMUI) 54 located in each of a plurality of Optical Distibution Shelves (ODSs) 30 is used for implementing the limited testing specified in TA-NWT-000909. Each Optical Distribution Shelf (ODS) 30 may contain slots for insertion of optical distribution units (ODUs). In the RT 12 of FIG. 2, there are up to 28 ODUs in each ODS. Each Optical Distribution Unit (ODU) is connected to an ONU 16 which provides drops to a plurality of subscribers. For the embodiment shown, each ONU serves up to 24 subscriber DS0 lines over a plurality of line units (LU) 78. Although the above described architecture provides for 24 DS0 time slots only 16 subscriber lines are actually implemented.

When the network demands the results of a mechanized loop test, such as a drop test, the DNC 114 commands the RMUI to bridge a test access path (TAP) 62 of the RT with a resistive signature. These resistive signatures correspond to status conditions for the line being tested in the ONU. The RMU 118 reports these values to a Loop Maintenance Operations System (LMOS) 122, which interprets the test signature as a specific FTC line failure. It should be realized that the terms LMOS and RSB are basically synonymous. Before LMOS (which is a centralized maintenance center) came along, the "service bureaus" were test/maintenance desks—usually located in COs.

Communication from the DNC 114 to the RMUI 54 is through the ACU 116 which interfaces the DNC through a Multiprocessor Serial Interface (MSI) bus 124. The MSI 124 is a transistor-transistor logic (TTL) level bus operating at 128 kbps. The ACU 116 converts the signal from the DNC 114 to a Balanced Serial Link Interface (BSLI) format which is transmitted on bus 60 to the CSAU 53 and the RMUI 54. The CSAU 53 uses a low-speed serial link interface (LSSLI) bus (not shown) interconnected between itself and the ODUs to collect alarm, status and inventory data. The RMUI uses the BSLI to receive commands to place signature resistors across the TAP.

The CSAU 53 essentially provides the interface between the DNC 114 and the various units located in the ODS 30. As previously mentioned, the CSAU retrieves alarms, status and inventory data from the units of the ODS 30 and relays this information to the DNC 114. The DNC 114 communicates with components of the core 24 over the MSI 124, which connects to the ACU 116, which is connected to the CSAU 53 through the BSLI bus 60. The CSAU 53 uses the LSSLI 56 to communicate with the other units of the ODS 30.

With the assistance of the above-mentioned components, according to the co-pending cross-referenced application cited above, the MLT subscriber loop tests may be performed as follows: The LSP 73 will run routine periodic tests on all lines in its ONU 16 using the line card 78 relays, the TAC 82 and the OTU 84. The tests run are those detailed in TA-909 in a specific priority sequence under control of the LSP 73. The LSP controls the line unit 78, TAC 82 and OTU 84 via the LUIB 76. If a line scheduled for routine tests is busy, it will not be accessed, but its last test result will be kept in the memory of the LSP 73. The data for all line test results are stored in the LSP memory until the LSP is requested to do a line test via the normal MLT test methods. When this happens, the normal channel testing proceeds, i.e., Pair Gain Test Controller (PGTC) 128 to COT 10 to RT 12 to ONU 16 to TAC 82. If the time to report the test is lengthened in the MLT sequence, the actual testing will be done when commanded, rather than routinely done in a background mode at the ONU. The test result would then not need to be stored, but immediately forwarded from the OTU to LSP to DNC. Meanwhile, the LSP 73 forwards a code to the DNC 114 in the associated core 24 over the VI channel of the Serial Bus Interface (SBI) 18 using techniques as disclosed in U.S. Pat. No. 5,027,349, which is incorporated herein by reference. The LSP code tells the DNC 114 to place a specific resistive signature across the TAP 62 of the RMU 118. This same TAP is used for both metallic measurements of lines originating from the RT and for signature recognition of ONU originated lines. The resistive signature is placed across the TAP 62 using a control path through the ACU 116 and the RMUI 54, as previously discussed. Upon seeing this signature, the RMU 118 reports back to the test head (TSC) 126 the parameters of the line/signature that were encountered on the line which was tested and the LMOS 112 interprets the condition received by the TSC 126. Only one failed signature is applied, that signature being the first test failed, since the OTU goes through its tests on a priority basis.

In order to implement the tests, a pair of simple POTS metallic pairs (DS0 #1 and DS0 #2) must be available in the RT, as shown in FIG. 2. These pairs may be provided by using a line shelf (LS) 130 installed at the RT 12, or two pairs could be brought in from a closely located ONU 16. One pair is used as the DS0 interface required for the RMU control path and is shown as the dial-up DS0 in FIG. 2, while the other pair may be used for orderwire purposes at the FAP for possible connection to a craft head set. Each pair must have an associated telephone number.

According to the teachings of the present invention, a metallic test unit, the same or similar to the OTU, may occupy any ONU or RT line card slot.

Thus, the present invention provides the means necessary to implement "MLT-like" testing (scaled-down subset based on TA 909 test list) of subscriber loops, even when fiber is used in the network directly to a curbside location. The invention implements the requirements of Bellcore Technical Advisory TA-NWT-000909 and performs the required tests but does them without requiring a PGTC, TSC, LMOS or RSB.

Figure 3:
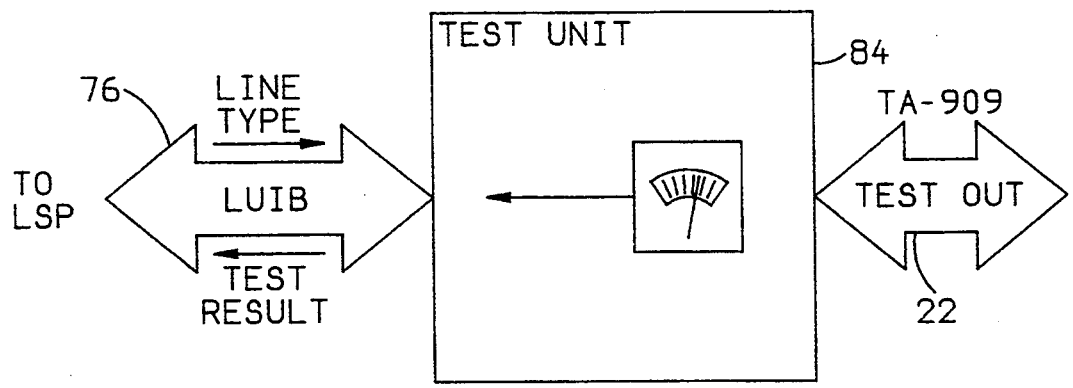
FIG. 3 shows the OTU of FIG. 1 in more abstract form, according to the present invention.

FIG. 3 shows the "test-out" capability provided, in simplified form, according to FIG. 1 and the above-referenced co-pending application, for an ONU Test Unit (OTU) 84 which is able to be used to test copper loop pairs as defined for FTC and as used in the present invention. The TA-909 tests are run on the subscriber equipment and lines on the "test-out" bus after isolating the subscriber's equipment and transmission lines from the normal communication paths back to the switching matrix via the remote terminal backplane connections, interfaces and signal paths. The test results are reported back via the LUIB to the LSP for eventual communication to the LMOS.

Figure 4:
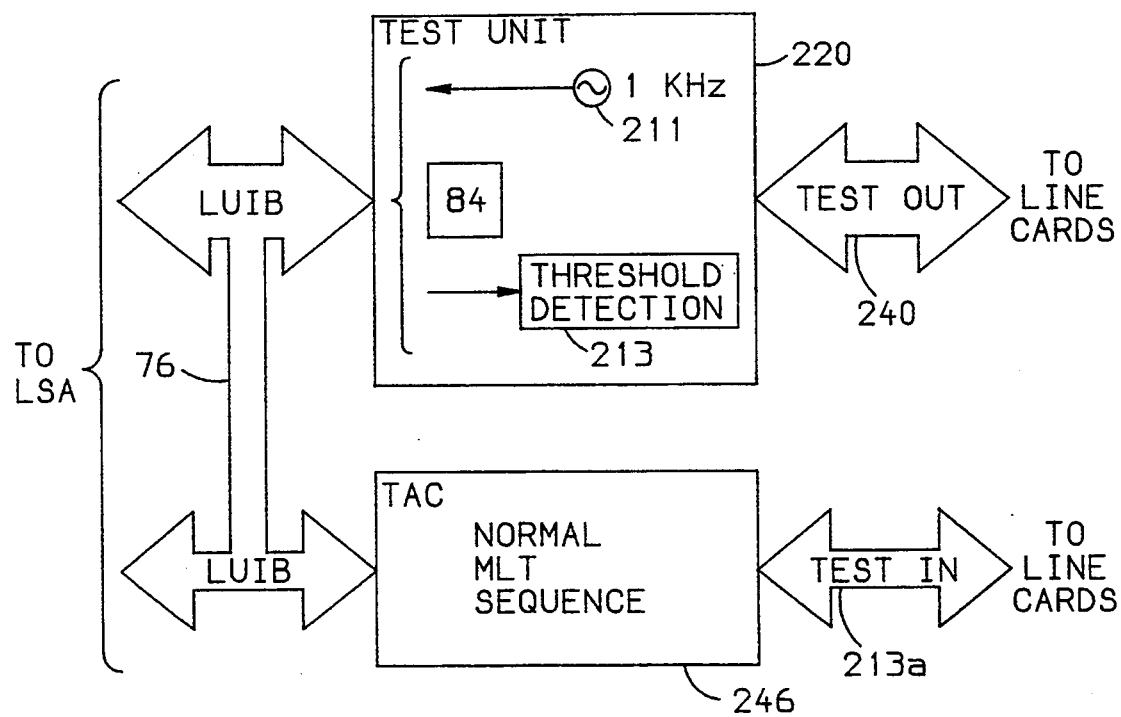
FIG. 4 shows a test unit in conjunction with a Test Access Unit (TAC), according to the present invention, having both test-in and test-out capabilities.

In accordance with the present invention, FIG. 4 shows a use of the test unit of FIG. 3 to include not only the test sequence previously described for testing subscriber equipment in a "test-out" mode, but also including additional elements and a new configuration for performing "test-in" type tests as well without having to use a PGTC or a repair service bureau.

In FIG. 4, the test unit may further comprise a simple tone generator 211, e.g., a PCM tone at 1 KHz, for sending a tone over the LUIB 76 on a transmit DS0 dedicated to a card slot into which the test unit is plugged. A PCM tone (or quiet termination) can be injected on the DS0 in this manner, cross-connected in the core via the Time Slot Interchanger (TSI) (not shown) to the DS0 of the line to be tested, with the received DS0 being returned to the test unit on the LUIB for a threshold measurement, as shown in FIG. 4 by means of a threshold detector 213. This allows the normal "test-in" MLT functions to be exercised in coordination with termination and sensing circuitry in the TAC via a "test-in" bus 213a (all controlled by the LSP), but without MLT, as previously practiced by means of a PGTC. I.e., a test sequence to ring the line, detect ringing, a threshold ERL test, a receiver on hook test, an ICN threshold test, a coin test, etc. Putting these test functions in an RT line shelf or ONU, according to the teachings hereof, effectively gives the operating company personnel rudimentary line/drop test capability from a craft terminal, whether or not they have MLT or are connected to any other loop maintenance OS.

Figure 5:
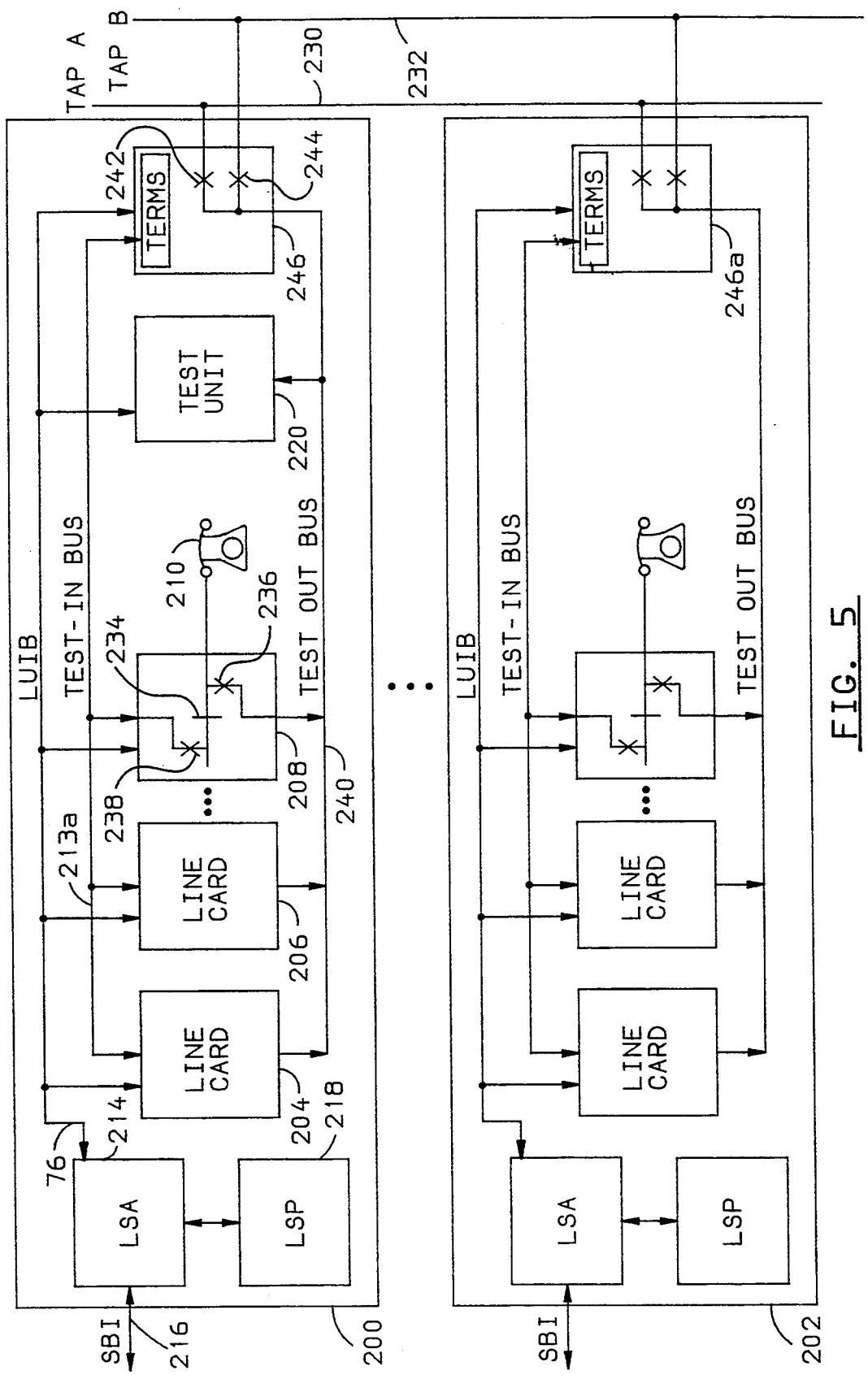
FIG. 5 is an illustration of a plurality of line shelves in a remote terminal, having a test unit similar to the ONU test unit of the above-cited co-pending application installed in one of the line shelves for line/drop testing from a craft terminal using the test unit, according to the present invention.

FIG. 5 shows a plurality of line shelves 200, . . . , 202 in a remote terminal (RT) having a plurality of such line shelves, each having a plurality of subscriber line cards 204, 206, . . . , 208, each for providing telephonic service to at least one (but typically two) subscriber terminal 210 over a line card using the line unit interface bus (LUIB) 76. The LUIB, in the embodiment shown herein, comprises four serial buses running at 2 Mbit/s having configuration information, PCM voice, signaling and provisioning, and one 256 kbit/s serial bus having remote inventory functions. Of course, other interface buses may be used in other embodiments.

The LUIB 76 is the communication mechanism between the LSA and all other cards resident in a line shelf. The line shelf access (LSA) unit 214 has the function of interfacing with a serial bus interface 216 operating at approximately 4 Mbit/s and as detailed in U.S. Pat. No. 5,060,229, and converting the data on this bus, in addition to data received from the LSP, to the LUIB described above. Further details of operation of the LSA are shown in co-pending U.S. patent application Ser. No. 07/738,315, which is hereby incorporated by reference.

As described above in connection with the ONU test unit of the co-pending application Ser. No. 07/738,102, using normal MLT procedures, the LSP in the present invention may also routinely initiate and run the necessary tests. These would be the same scaled-down version of the tests as described in that above-cited co-pending application. In other words, a test unit 220, according to the present invention, does a scaled-down version of what the RTU or RMU did in the RT as shown for FTC purposes therein, i.e., about nine tests. These tests are run by the test unit 220 on a routine basis. The Test Unit 220 may be used to tell the LSP 218 via the LUIB 76 what test, if any, has failed. The LSP sends the test information to the DNC over ONU/ODU to RT/ODS to DNC to ACU to RMUI. The DNC tells the Remote Measurement Unit Interface (RMUI) to put a resistive signature across the test path. The RTU reports back to the operating system with the resistive signature.

According to the embodiment shown, the test unit 220 of FIG. 5 is the same size as a line card or line unit 204, 206, . . . , 208. As such, according to the above-referenced co-pending application, it is already designed to be communicating with the LUIB 76. If test access paths 230, 232 are present in the remote terminal for connection to the line shelves 200, . . . , 202, then we have set up a situation, according to the present invention, where the test unit 220 is able to do "test-out" type tests on the subscriber equipment 210 and all the accompanying transmission lines up to a normally closed contact 234 in each line card. In order to get access to the test unit, a normally open contact 236 is closed for this purpose, while all similar normally-open contacts remain open on all other line cards during subscriber loop testing over a test-out bus 240. A pair of normally open contacts 242, 244 in a test access unit 246 are open if a line card in RT 200 is being tested with the test unit 220. The test unit 220 may include the circuitry shown in FIG. 1 and may, for example, perform all of the tests previously described in connection therewith in conjunction with direction received from the LSP 218.

If, however, it is desired to test in a similar fashion a line card in another line shelf, such as line shelf 202, then the normally open contact 242 may be closed so that access to a line card in another line shelf may be gained by means of connecting test access path A 230 through another TAC 246a contact to a line shelf test-out bus connected to the line card which is desired to be tested.

Thus, a craftsperson can plug into a COA at the RT or, at an ONU, plug into an OPU, and request line testing. At that point, the line card activates by order of the LSP the test-in/test-out relays. It will do the test-in function using the test-in bus, the LUIB and the additional circuitry shown in FIG. 4, using the DS0 cross-connect capability of the Time Slot Interchanger (TSI) in the core. If a line card within the line shelf in which the test unit resides is being tested, only one TAC 246 need be activated. In that case, the TAC is used to simulate a subscriber with precise terminations, ring trips, on/off hooks, etc., while the line circuit being tested responds to the conditions sent to it over the LUIB. At the same time, the test unit activates its relays to do the test-out functions. In other words, the test unit tests out to the subscriber equipment. The test results are reported to the LSP via the LUIB.

During "test-in" type tests (line card testing), the test unit sends its test tone (e.g., 1 KHz PCM) to the time slot interchanger for cross-connection to the line under test. It may also send quiet sequences. The TAC applies the line terminations required for the line card "test-in" tests.

Figure 6:
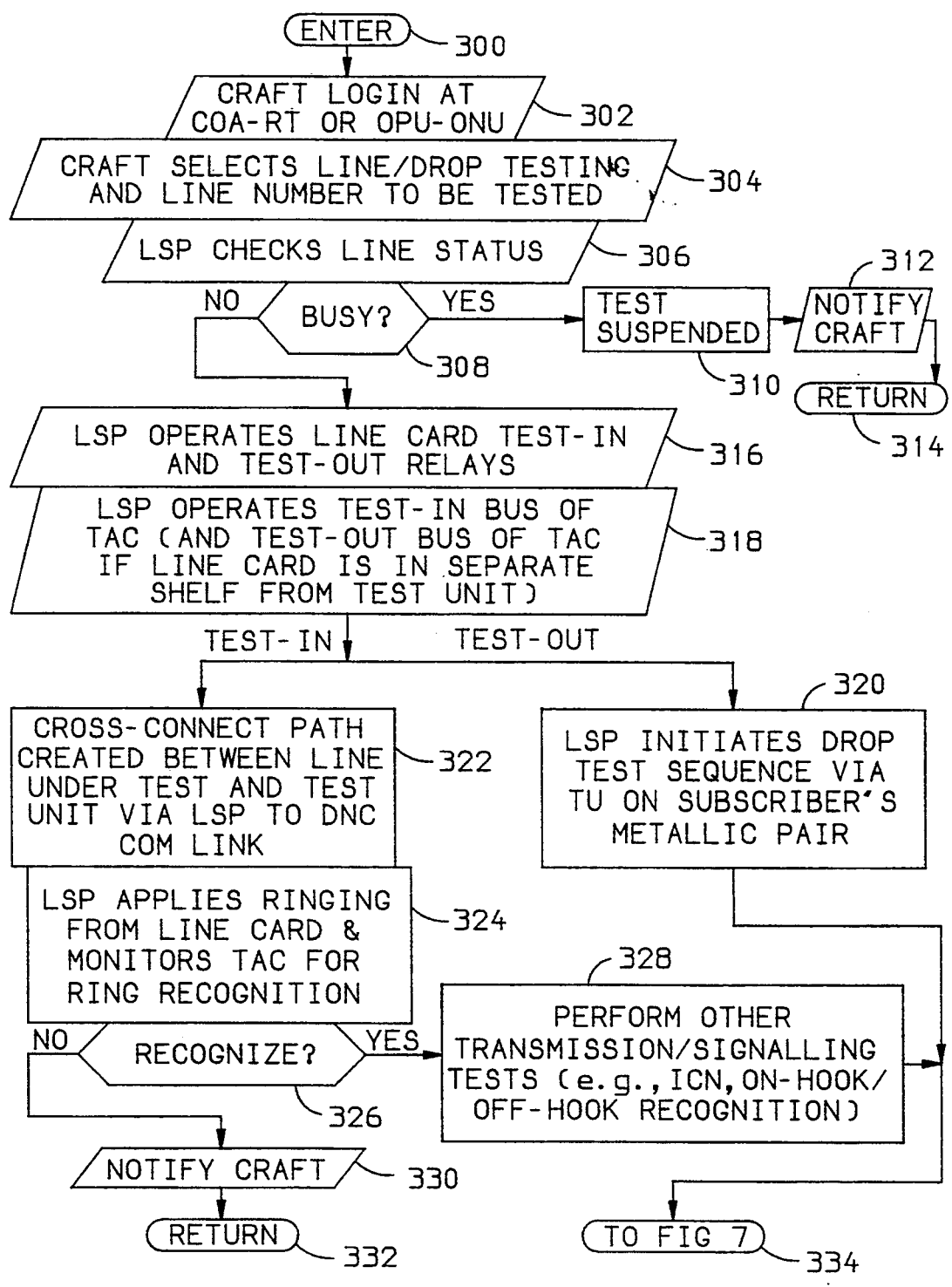
FIGS. 6 and 7 show a craft initiated test sequence, according to the present invention.

FIG. 6 shows a test sequence, according to the present invention, in which after entering at a step 300, a craft person logs in as shown in a step 302 at a COA-RT (or remotely from a COA at the COT) or at an OPU-ONU. The craft person may then select the desired line/drop testing and the line number to be tested as indicated in a step 304. In response, the LSP checks the dialed line's status as indicated in a step 306 and 308. If busy, the selected test is suspended as indicated in a step 310 and craft is notified of same in a step 312 whereafter a return is made in a step 314. If not busy, a step 316 is executed in which the LSP operates the line card test-in and test-out relays 238 and 236 in FIGS. 5 and 8.

The LSP is then set up to monitor the test-in bus circuitry of the TAC 246 for signalling recognition and the test unit 220 is connected via relay contacts 236 to the subscriber equipment 210 by means of the test-out bus 240; if the line card is in a separate shelf from the test unit, the test-out bus of the TAC 246 is operated (relays 242 or 244 of FIG. 5) as well as shown in a step 318.

At this point, the test-in and test-out test procedures are run simultaneously as shown by the flow chart branching into two separate paths at this point. The test-out branch begins with a step 320 in which the LSP initiates a drop test sequence via the test unit on a subscriber's metallic pair. At the same time, a cross-connect path is created, as shown in a step 322, between the line under test and the test unit controlled by the LSP to DNC VI channel communication link.

Figure 7:
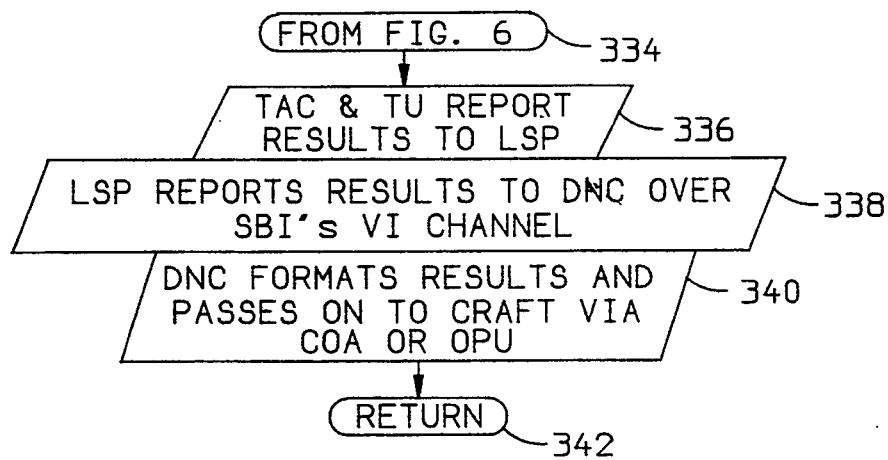

After executing step 322, a step 324 is next executed in which the LSP applies ringing from the line card and monitors the TAC for ring recognition. If recognized, as indicated in a step 326, a step 328 is executed in which other transmission/signaling tests such as ICN, on-hook/off-hook recognition, etc., are performed. If not recognized, craft is notified as shown in step 330 and a return is made in a step 332. After either or both of steps 320, 328 are executed, a transition is made as indicated in a step 334 to FIG. 7 where a step 336 is next executed in which the TAC and OTU report results to the LSP. The LSP next reports results to the DNC over the SBI's VI channel as indicated in a step 338. The DNC formats the results and passes them on to the craft via either the COA or OPU as indicated in a step 340. A return is then made as indicated in a step 342. It should be noted that if testing is initiated from the craft terminal, the TA909 testing priority need not be invoked. In fact, according the the present invention, any test on the test list can be selected at any time, regardless of priority.

Figure 8:
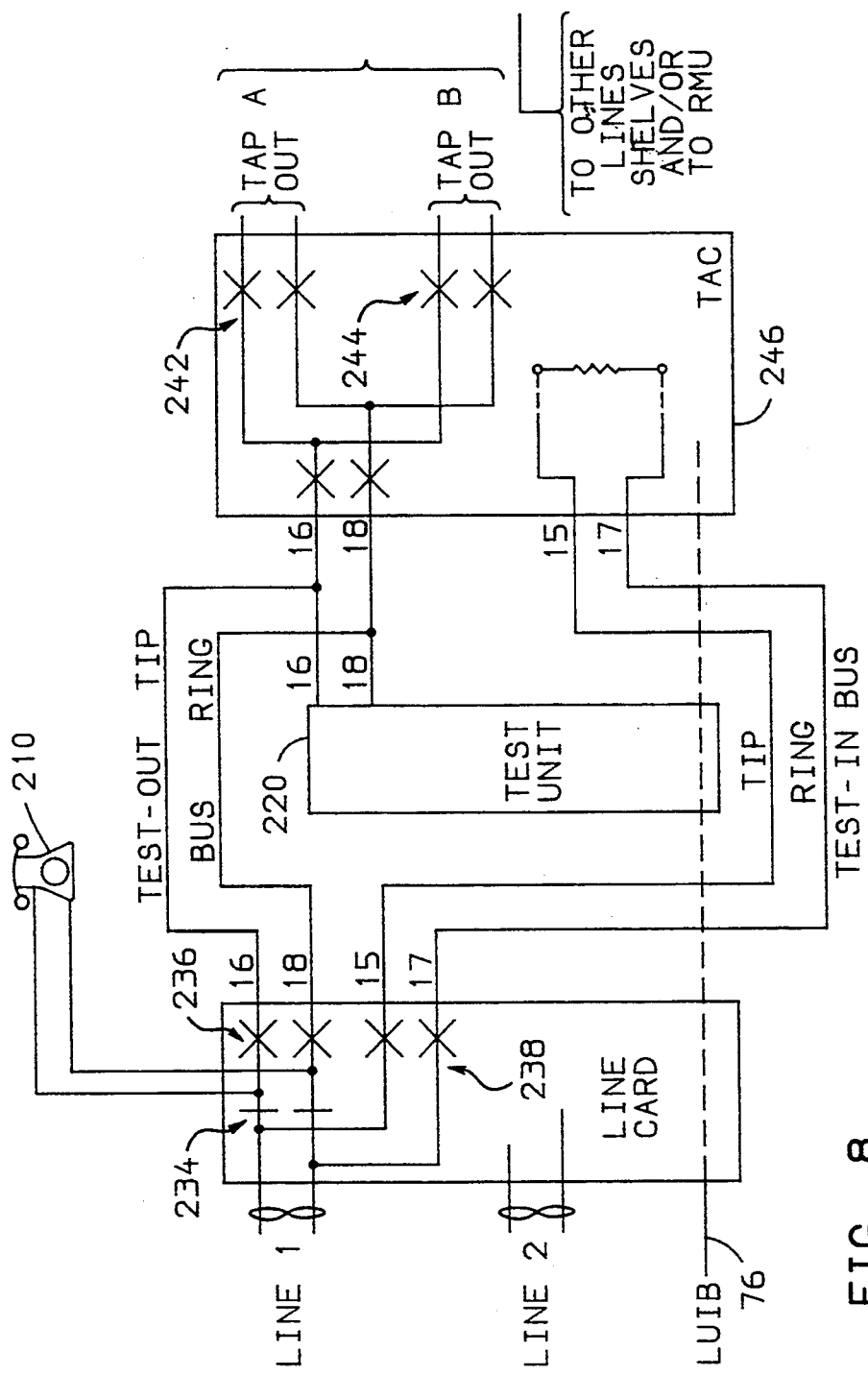
FIG. 8 shows an input/output configuration, according to the present invention.

Referring now to FIG. 8, it will be recalled that a propitious definition of input/output (I/O) was called for herein wherein the test unit 220 of FIG. 5 is the same size as a line card or line unit. As such, it is particularly advantageous, according to the present invention, to define the I/O of the test unit such that it is easily interchangeable in any line card slot in such a way that it can connect up to any particular line in the rack. As shown in FIG. 8, for example, the line card is shown as having two lines, one of which is shown in detail having "test-out" output pins in the same place as every other line card in the shelf at position 16 and 18 which all plug into the same bus in the back plane of the shelf. Similarly, the test unit 220 is designed to have its ring and tip I/O lines hooked up to two similarly positioned output pins on a similarly sized card so that they are interchangeable and electrically compatible at the same I/O points 16, 18. Similarly, the TAC is of the same size and plugs into the same back plane bus at specific positions on a similarly configured card.

Referring now to FIGS. 6 and 8 together, when the LSP operates the test-in/test-out relays as indicated in the step 316, this refers to relay contacts 234, 236 and 238. This allows the line card to disconnect itself from the subscriber and connects the subscriber to the test unit 220. If the subscriber line is in a line shelf other than that in which the test unit resides, access is obtained through the operation of TAC relays 242 (or 244) in the test unit's shelf and similar TAC relays 242 (or 244) in the line-to-be-tested's shelf, with TAP A (or B) connecting the two TAC units (this corresponds to step 318 in FIG. 6).

Figure 9:
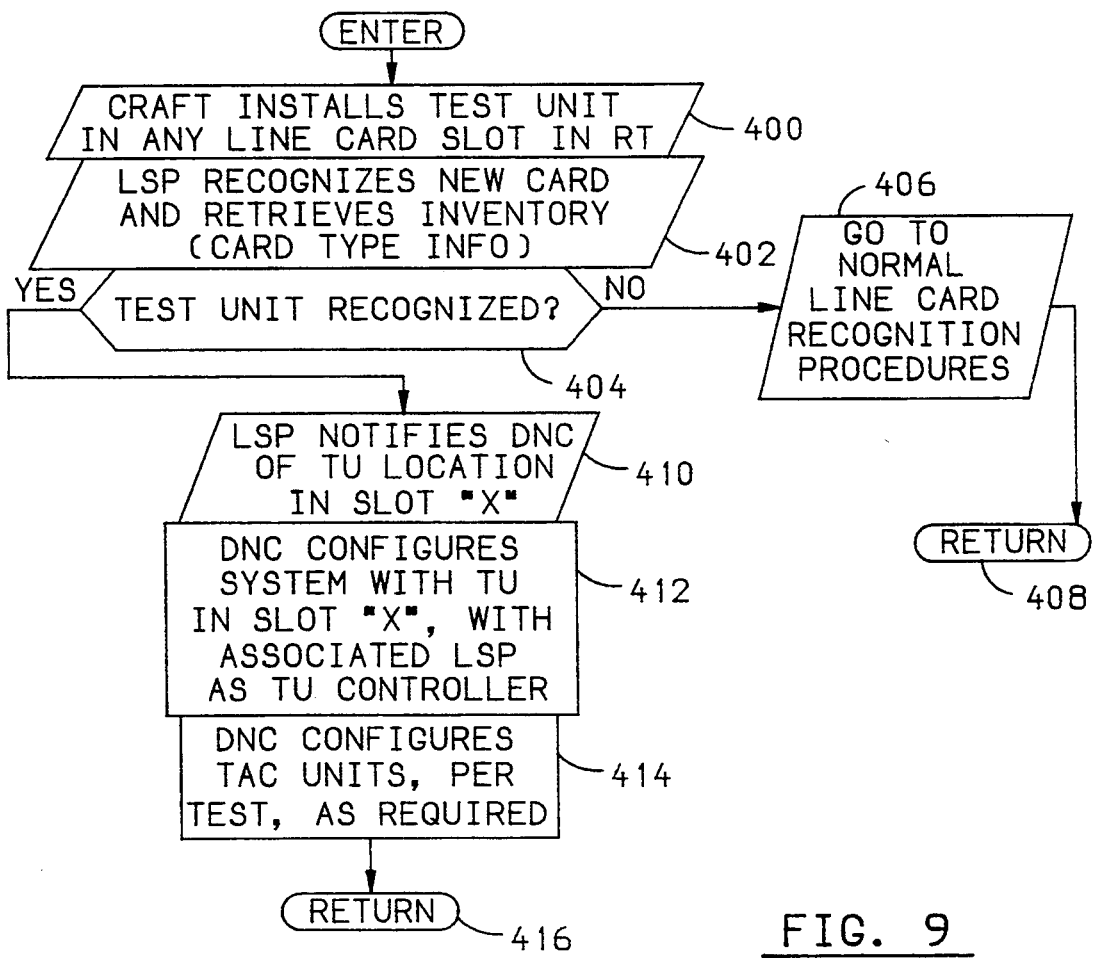
FIG. 9 shows a routine which may be executed upon the installation of a test unit on a line card slot, according to the present invention.

Referring now to FIG. 9, a flow chart is there illustrated showing the sequence of events which occurs after a craft person installs a test unit 220 in any line card slot in a remote terminal as indicated in a step 400. Thereafter, as indicated in a step 402, the LSP recognizes a new card and retrieves the inventory information therefrom. If the test unit is not recognized, as indicated by a negative response after a step 404 is executed, a step 406 is executed in which normal line card recognition procedures are next executed. A return is then made as indicated in a step 408. If, on the other hand, the test unit was recognized in step 404 then the LSP notifies the DNC of the test unit location, e.g., in slot "X", as indicated in a step 410. The DNC next configures the system with the test unit in card slot "X" with its associated LSP as the test unit controller, as indicated in a step 412. The DNC next configures the TAC units, as indicated in a step 414, per specific line being tested, as required. A return is then made as indicated in a step 416.

The invention, having been shown and described with respect to a best mode embodiment thereof, it should be realized that the foregoing and various other changes, omissions and additions in the form and detail thereof may be made therein without departing from the spirit and scope of the invention.

I claim:

1. A method for testing in a digital loop carrier (DLC) system having a remote terminal (RT) connected between a plurality of subscribers and a central office or for testing in a fiber-in-the-loop system having a remote terminal (RT) connected between a central office and an optical network unit (ONU) by optical fibers and having metallic drop connections between a plurality of subscribers and the ONU, comprising the steps of:

selecting, from a craft interface in the RT or in the ONU, line and/or drop testing and a line number to be tested;
checking line status and, when busy, suspending testing but, when available, isolating a selected subscriber equipment from an associated line and, for
(i) line testing, by terminating the line with an impedance via a test-in bus and cross-connecting at the remote terminal the associated line and a test unit in a line card slot in the RT or the ONU and performing selected tests on the associated line and/or, for
(ii) drop testing, by connecting the selected subscriber equipment to the test unit via a test-out bus by providing selected test signals from the test unit to the subscriber equipment; and
providing test result signals via a craft interface at the ONU or the RT.

2. Apparatus, comprising:
control means, responsive to a request for testing signal from a craft interface, the request for testing signal being provided directly on a line unit interface bus (LUIB) or being one digital signal zero signal among a plurality of digital signal zero signals, for providing a line isolation control signal on the LUIB and for providing a cross-connect path between a line to be tested and the LUIB and responsive to line and drop test result signals for reporting to the craft interface;
isolation means, responsive to the line isolation control signal, for isolating a selected subscriber equipment from the line to be tested and having means, responsive to a line drop test initiation signal from the control means, for connecting a test-out bus to the equipment;
a test unit, connected by means of the cross-connect path via the LUIB to the line to be tested, for providing selected line tests and for providing the line test result signals to the control means via the LUIB; and
test access means, responsive to the line isolation control signal, for terminating the associated line with a selected impedance via a test-in bus and responsive to the line drop test initiation signal for providing line drop test sequence signals via the test-out bus to the selected subscriber equipment and for receiving test response signals back from the equipment for comparison with expected response signal values for providing the drop test result signals to the control means via the LUIB.

3. A test unit, comprising:
a card for insertion in a line card slot of a line card shelf in a structure having a number of associated line card shelves, wherein the shelf recognizes the card as a test unit and provides a selected test configuration for the structure via a line unit interface bus in the shelf;
means on the card, responsive to a drop test request from the line unit interface buss in the shelf, for providing a drop test sequence on an output thereof via a test-out bus in the line card shelf;
means on the card, responsive to a line test request from the line unit interface bus, for providing a selected line test sequence on the line unit interface bus and wherein the card provides report signals for reporting results of the line and drop test sequences via the line unit interface bus to a craft interface in the structure.

4. The test unit of claim 3, wherein the test unit output is connected to the test-out bus with pins inserted into card receptacles in a line shelf for receiving pins on line cards having the same orientation as the pins on the test unit card.

5. The test unit of claim 4, wherein the test unit is insertable into any line card slot of any line shelf in the structure for testing any line card in said any line shelf via test access units connected between associated line card shelves.

* * * * *